(12) United States Patent
Kusters et al.

(10) Patent No.: US 8,386,434 B2
(45) Date of Patent: Feb. 26, 2013

(54) OPTIMIZING DEFRAGMENTATION OPERATIONS IN A DIFFERENTIAL SNAPSHOTTER

(75) Inventors: Norbert P. Kusters, Woodinville, WA (US); Benjamin A. Leis, Seattle, WA (US); Mark J. Zbikowski, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 139 days.

(21) Appl. No.: 12/646,640

(22) Filed: Dec. 23, 2009

(65) Prior Publication Data

US 2010/0100701 A1    Apr. 22, 2010

Related U.S. Application Data

(62) Division of application No. 10/684,900, filed on Oct. 14, 2003, now Pat. No. 7,664,771.

(60) Provisional application No. 60/419,252, filed on Oct. 16, 2002.

(51) Int. Cl.
  *G06F 7/00* (2006.01)
  *G06F 17/00* (2006.01)
(52) U.S. Cl. ...................................................... 707/657
(58) Field of Classification Search .................. 707/657, 707/999.2
See application file for complete search history.

(56) References Cited

U.S. PATENT DOCUMENTS

| | | | |
|---|---|---|---|
| 5,574,907 A | 11/1996 | Jernigan | 707/1 |
| 5,956,745 A | 9/1999 | Bradford | 711/137 |
| 6,289,356 B1 | 9/2001 | Hitz | 707/201 |
| 6,308,636 B1 | 10/2001 | Collins | 711/103 |
| 6,434,681 B1 | 8/2002 | Armangau | 711/162 |
| 6,473,775 B1 | 10/2002 | Kusters | 707/200 |
| 6,526,493 B1 | 2/2003 | Ding | 711/170 |
| 6,615,365 B1 | 9/2003 | Jenevein | 714/6 |
| 6,629,202 B1 | 9/2003 | Cabrera | |
| 6,636,879 B1 | 10/2003 | Doucette | 707/205 |
| 6,643,671 B2 * | 11/2003 | Milillo et al. | 707/622 |
| 6,651,075 B1 | 11/2003 | Kusters | 707/204 |
| 6,779,094 B2 | 8/2004 | Selkirk | 711/165 |
| 6,799,258 B1 * | 9/2004 | Linde | 711/162 |
| 6,934,822 B2 | 8/2005 | Armangau | 711/162 |
| 6,978,283 B1 | 12/2005 | Edwards | 707/206 |

(Continued)

OTHER PUBLICATIONS

White paper: *Using Relational Databases with VERITAS Database Edition Release 2.0*; Feb. 1999.

(Continued)

*Primary Examiner* — Aleksandr Kerzhner
(74) *Attorney, Agent, or Firm* — Merchant & Gould

(57) ABSTRACT

A method for establishing and maintaining a differential snapshot of a set of files stored on a volume is disclosed. The invention achieves processing time and disk space optimizations by avoiding copy-on-write operations for logically insignificant moves of blocks, such as the block rearrangements characteristic of defragmentation utilities. A file system enhancement enabling the passing of a block copy command from the file system to lower-level drivers, is used to inform the snapshotter that a block move operation is not logically meaningful. When the logically insignificant move is of a block whose data forms part of the data captured in the snapshot virtual volume, and when the move is to a block location that is functioning as logical free space, the snapshotter can simply modify its block bitmap and update translation table entries without needing to perform a copy-on-write.

20 Claims, 14 Drawing Sheets

U.S. PATENT DOCUMENTS

| | | | |
|---|---|---|---|
| 6,993,539 B2 | 1/2006 | Federwisch | 707/201 |
| 7,010,553 B2 | 3/2006 | Chen | 707/203 |
| 7,043,485 B2 | 5/2006 | Manley | 707/100 |
| 7,100,089 B1 | 8/2006 | Phelps | 714/42 |
| 7,237,080 B2 | 6/2007 | Green | 711/162 |
| 2002/0083037 A1* | 6/2002 | Lewis et al. | 707/1 |
| 2002/0178335 A1 | 11/2002 | Selkirk | 711/162 |
| 2003/0149736 A1 | 8/2003 | Berkowitz | |
| 2003/0191911 A1 | 10/2003 | Kleinschnitz | 711/154 |
| 2003/0220951 A1 | 11/2003 | Muthulingam | 707/205 |
| 2004/0015672 A1 | 1/2004 | Masse | 711/173 |
| 2004/0141498 A1 | 7/2004 | Rangan | 370/380 |
| 2010/0100701 A1 | 4/2010 | Kusters | |

OTHER PUBLICATIONS

Brown, N.; *"Who wants another Filesystem?"*; Feb. 6, 2003; LCA 2003 conference.

Microsoft Corporation; *"Disclosure of Invention"*; Jun. 2002.

Czezatke, et al.; Freenix 2000 USENIX Annual Technical Conference Paper. pp. 77-88 of the Proceedings; *"LinLogFS—A Log-Structured Filesystem for Linux 2000"*.

\* cited by examiner

OPTIMIZING DEFRAGMENTATION OPERATIONS IN A DIFFERENTIAL SNAPSHOTTER

CROSS-REFERENCE TO RELATED APPLICATIONS

This application is a divisional of and claims priority to application Ser. No. 10/684,900, filed Oct. 14, 2003, now U.S. Pat. No. 7,664,771 entitled OPTIMIZING DEFRAGMENTATION OPERATIONS IN A DIFFERENTIAL SNAPSHOTTER, which claims benefit of priority of U.S. Provisional Application No. 60/419,252, filed Oct. 16, 2002.

FIELD OF THE INVENTION

The present invention relates generally to data storage, and more particularly to snapshots of file system volumes.

BACKGROUND OF THE INVENTION

Data storage is an essential feature of computer systems. Such storage typically includes persistent data stored on block-addressable magnetic disks and other secondary storage media. Persistent data storage exists at several levels of abstraction, ranging from higher levels that are closer to the logical view of data seen by users running application programs, to lower levels that are closer to the underlying hardware that physically implements the storage. At a higher, logical level, data is most commonly stored as files residing in volumes or partitions, which are associated with one or more hard disks. The file system, which can be regarded as a component of the operating system executing on the computer, provides the interface between application programs and nonvolatile storage media, mapping the logically meaningful collection of data blocks in a file to their corresponding physical allocation units, or extents, located on a storage medium, such as clusters or sectors on a magnetic disk.

Users and administrators of computer systems benefit from having the ability to recover earlier versions of files stored on the system. Users may accidentally delete or erroneously modify files. An administrator of a system that has become corrupted may wish to recover the entire state of a file system at some known good time before the corruption occurred. The underlying disk hardware can fail. A snapshot is one technique for facilitating the recovery of earlier versions of files.

A snapshot of a volume is a virtual volume representing a point in time on the original volume. Some snapshotters capture the point-in-time data by mirroring the entire contents of the volume in its snapshot state. By contrast, differential snapshotters do not make actual copies at the time of the snapshot. Rather, changes to the original volume are carefully monitored so that the virtual volume (i.e., the snapshot) can always be produced. A differential snapshotter will copy a block in the volume only if it is modified after the snapshot is taken; such a copy operation is called a "copy-on-write." The snapshot state of the volume can be reconstructed by using these copies of changed blocks along with the unchanged blocks in the original volume. In the usual case, many files in the volume will be left unchanged following the snapshot, so differential snapshotters provide a more economical design than nondifferential approaches. As many changes occur to the original volume, however, a differential snapshotter must keep a large area of disk space to hold the older versions of the disk blocks being changed.

In most operating systems, the extents that make up the physical allocation units implementing a particular file may be discontinuous, as may the pool of allocation units available as logically free space for use in future file space allocation. A disk volume in such a state is said to be externally fragmented. In many such operating systems, a volume can be expected to suffer from increasing external fragmentation over time as files are added, deleted and modified. External fragmentation increases the time necessary to read and write data in files, because the read/write heads of the hard disk drive will have to increase their lateral movement to locate information that has become spread over many non-contiguous sectors. If fragmentation is sufficiently severe, it can lead to significantly degraded performance and response time in the operation of the computer system.

Defragmentation utility programs provide an important remedy for data storage systems that are prone to external fragmentation. These utilities can be periodically run to rearrange the physical location of a volume's file extents so that contiguity of allocation blocks is increased and disk read/write access time is correspondingly reduced, improving performance. A defragmentation operation consists of moving some blocks in a file to a location that is free on the volume. More precisely, the contents of one block are copied to the free block location. The old location of the block becomes free and the new location of the block becomes occupied space. The defragmentation of a volume will typically involve an extensive number of such block moves.

Although users of file systems benefit from the disk speed optimizations achieved by defragmentation, the benefit has come at the expense of efficient use of differential snapshotters. If a volume is defragmented subsequent to the taking of a snapshot, the snapshotter will ensure that each data block relocation by the defragmenter is preceded by a copy-on-write of the block. The logical view of the original volume is unchanged by the defragmentation operations, but because the disk blocks on which the disk is physically manifested change drastically in content, the amount of space needed to maintain the snapshot explodes. This disk space explosion may be enough to destroy a principal reason for using differential snapshotters in the first place, that of disk space economy.

The problem seen in the interaction between differential snapshotters and defragmentation operations is that, prior to the present invention, differential snapshotters have not been able to distinguish logically significant writes of blocks from logically insignificant block moves, treating both as requiring copy-on-write protection. This problem is particularly acute when there is a volume defragmentation operation on the original volume, but those of skill in the art will appreciate that other file-manipulating programs besides defragmenters may require the nonlogical relocation or shuffling of file blocks. For example, a program might, for performance reasons, create a file of a particular size and arrange the blocks in a desired way before proceeding with further use of the file for writing data. Prior to the present invention, differential snapshotters have treated such block rearrangements as requiring copy-on-write protection.

It can be seen, then, that there is a need for an improvement in differential snapshotters so that logically insignificant moves of blocks from one volume location to another are recognized as not requiring copy-on-write protection in principle. The availability of more efficient differential snapshotters will make more likely the use of snapshots applied on a longer-term basis for data recovery. Moreover, such an improvement will lead to greater use of defragmentation utilities and therefore will allow disk speed optimizations to take place while having snapshots with little performance impact and little disk space consumed.

SUMMARY OF THE INVENTION

The present invention provides a method for capturing and maintaining a differential snapshot of an original volume in which logically significant modifications of blocks, which require copy-on-write protection, are distinguished from logically insignificant block moves, which in principle do not need to be preceded by copy-on-write operations. The invention involves the use of a file system with the ability to pass a BLOCK_COPY command down to lower-level, block-oriented drivers, a capacity not available in previous file systems, which enables such drivers to take advantage of hardware acceleration for data block movements. In particular, a snapshot driver, informed by the file system that a requested operation is a nonlogical block move, uses this enrichment in knowledge to avoid unnecessary copy-on-write operations. Instead, the snapshotter simply updates the translation table data structures it employs to keep track of which blocks must be protected by copy-on-write operations and where the snapshot versions of blocks are being stored.

Those skilled in the art will readily perceive that the present invention is also applicable to differential snapshots of files and volumes contained on block devices other than magnetic disk media and to the use of differential snapshotters to reconstruct time-defined versions of other persistent data structures. Other aspects and advantages of the invention will become apparent from the following detailed description, taken in conjunction with the accompanying drawings, illustrating by way of example the principles of the invention.

DETAILED DESCRIPTION OF THE INVENTION

A differential snapshotter does not have to perform any copy-on-write operations on disk space that was logically unused at the time of the snapshot. This is true because the disk blocks that are free on that snapshot will never need to be read when the snapshotter produces a logical volume file or directory. For this reason, a differential snapshotter may have a bitmap of the blocks on the volume. It may set the bit to one bit value, such as 1, for blocks that are free at the time that the snapshot was taken, and it may set to the same value the bits corresponding to blocks that have already had a copy-on-write since the time of the snapshot. Clearly, only bits that have the other bit value (0 if the first bit value is 1) need to have their blocks copied-on-write. (In the accompanying drawings it is assumed that the first bit value, which may be called an "ignore" value, is 1 and that the second bit value, which may be called a "protect" value, is 0. However, the invention is of course equally applicable to embodiments which use 0 as the "ignore" value and 1 as the "protect" value.)

A defragmentation operation consists of moving some blocks in a file to a location that is free on the volume. The old location of the block becomes free and the new location of the block becomes occupied. Therefore, it suffices for a differential snapshotter in accordance with the invention to be informed that a block is moving from A to B so that it can change its view of what is free space and what is occupied space without performing any copy-on-write operations but instead simply updating a translation table.

Figure 1:
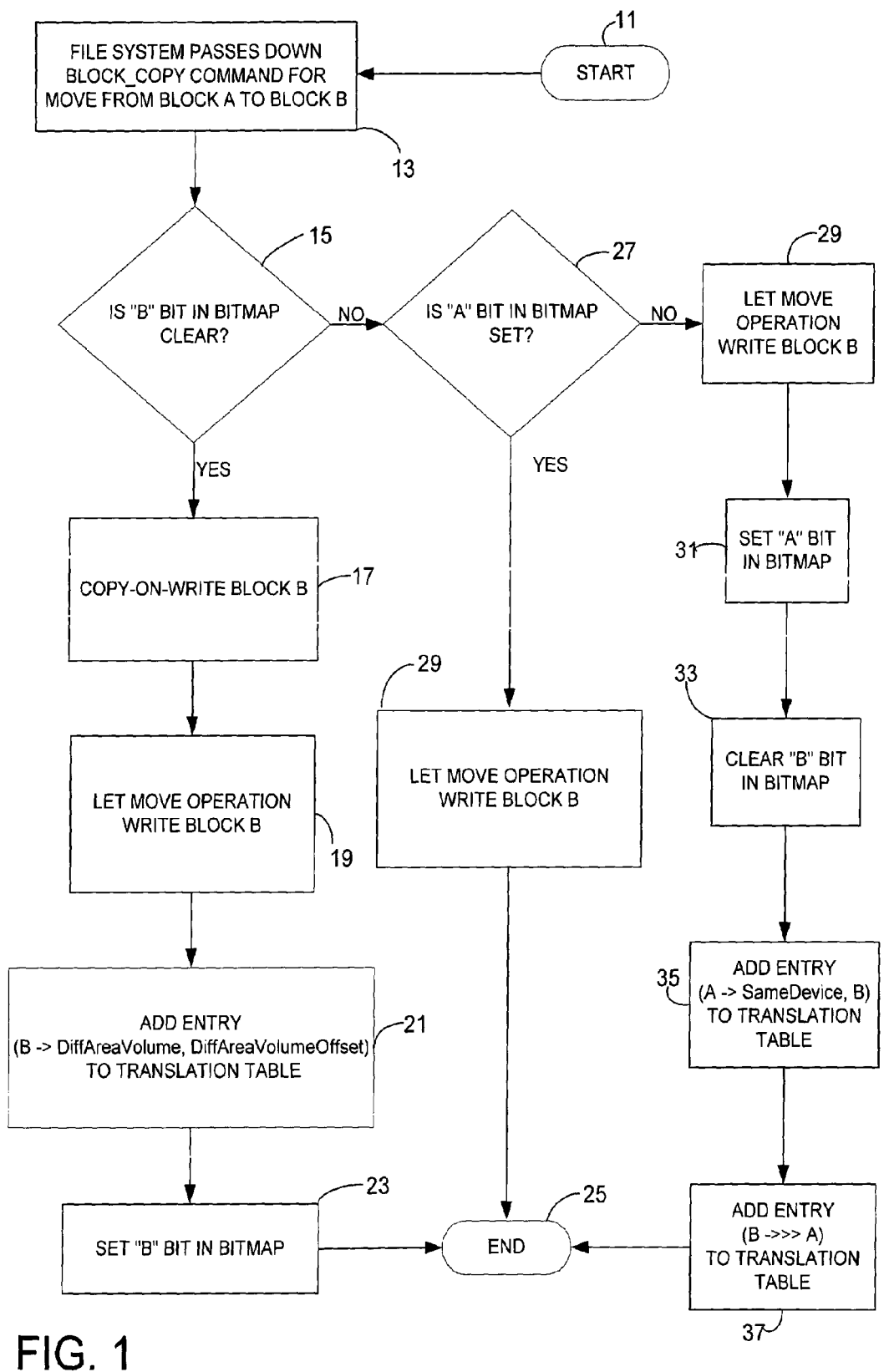
FIG. 1 is a flow diagram illustrating the steps taken in an embodiment of the invention with respect to a block move from a block location A to a block location B.
Figure 2:
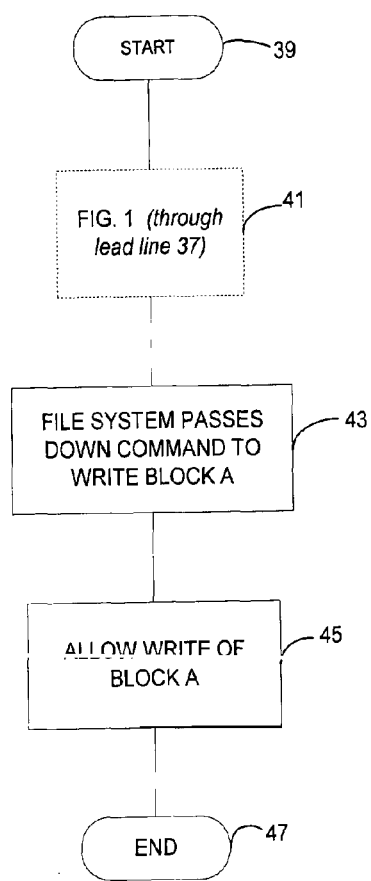
FIG. 2 is a flow diagram illustrating the steps taken under two scenarios in an embodiment of the invention following the block move from A to B of FIG. 1 in the case where, before the move, the snapshotter bitmap bit for block B is set and the bitmap bit for block A is clear, with FIG. 2A illustrating the scenario where A is written, and with FIG. 2B illustrating the scenario where there is a write to B.
Figure 2:
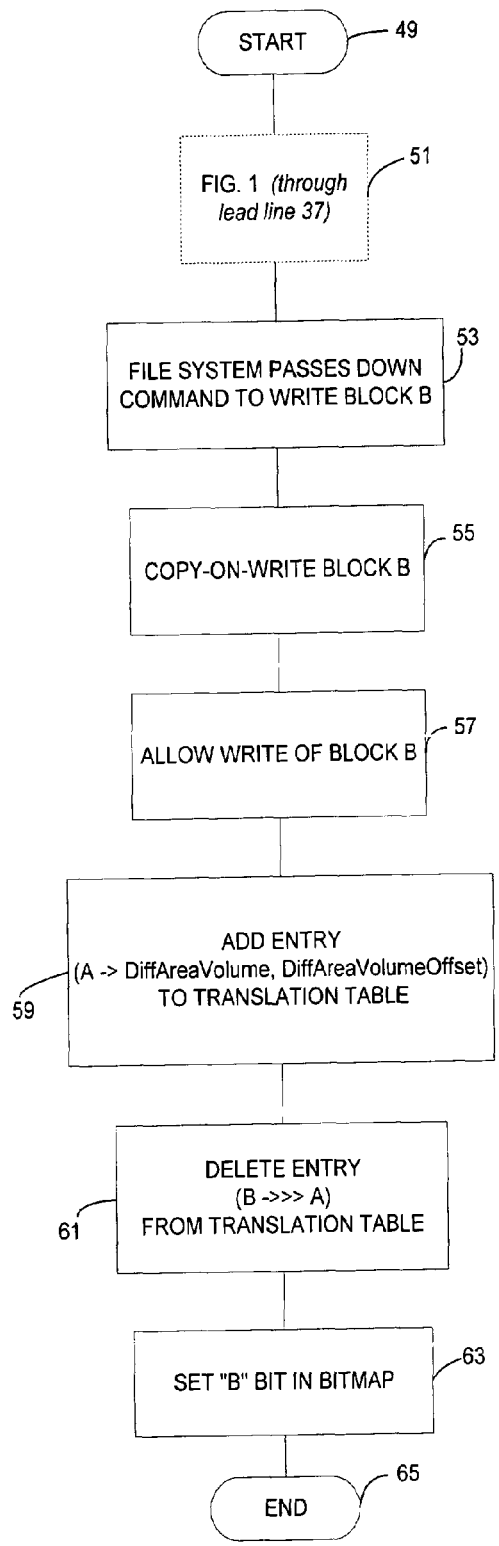
Figure 3:
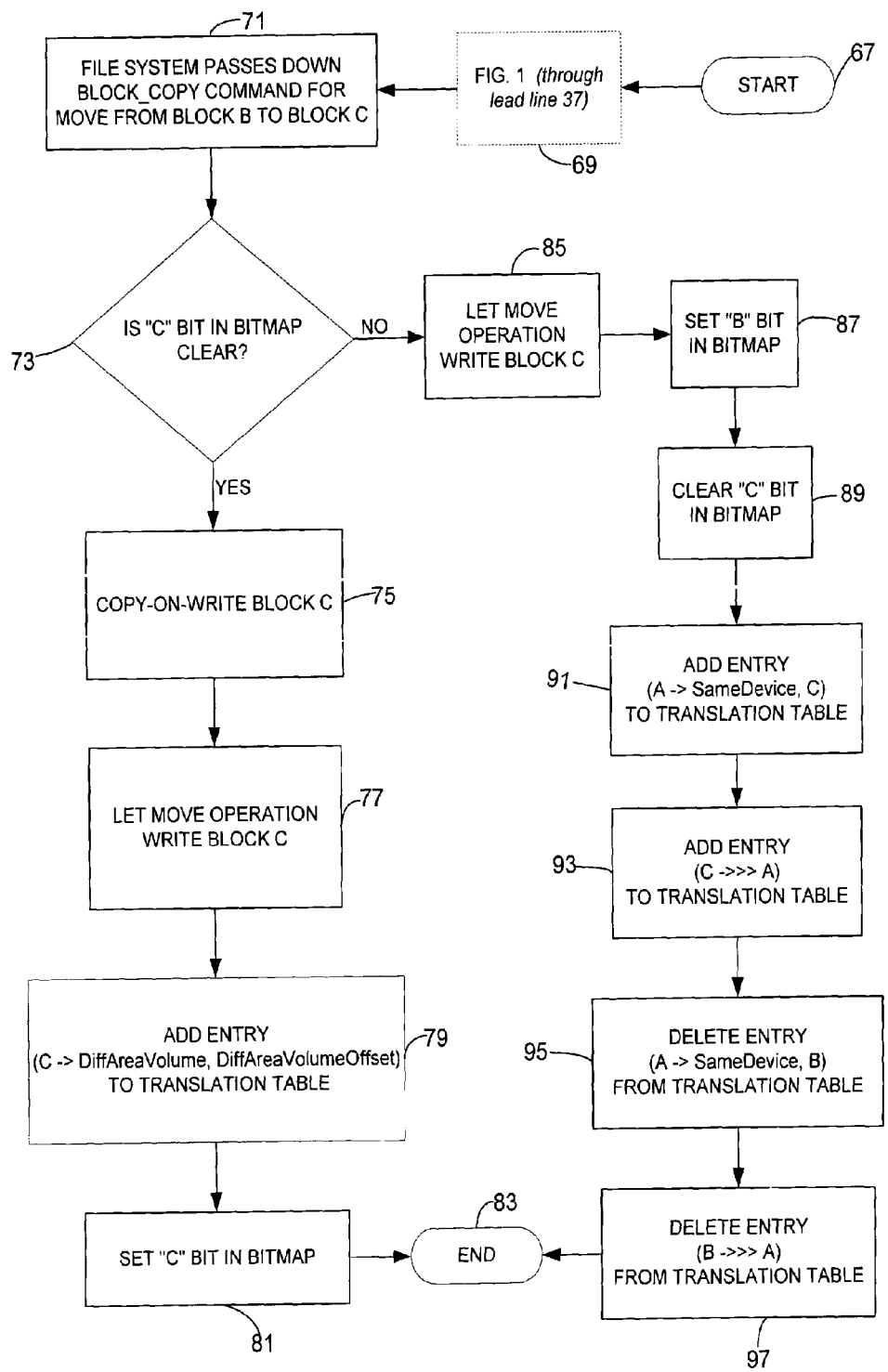
FIG. 3 is a flow diagram illustrating the steps taken in an embodiment of the invention following the block move from A to B of FIG. 1 in the case where, before the move, the bitmap bit for block B is set and the bitmap bit for block A is clear, and where, after the move, a write of B has not yet occurred and a move of block B to a block location C is initiated.

FIGS. 1-3 illustrate details of an embodiment of the invention in handling a block move from block A to block B. Turning to FIG. 1, the procedure begins at step 11. The differential snapshotter is informed that a block is moving from A to B by way of a BLOCK_COPY command passed down by the file system (step 13), rather than a READ_BLOCK followed by a WRITE_BLOCK. This tells the differential snapshotter what operation is taking place. The differential volume snapshotter keeps a bitmap of one bit for every block, where the bit being set indicates that the snapshotter does not need to take any action when it is written. A clear bit indicates that the snapshotter has to take the copy-on-write. The snapshotter keeps a translation table of (Block #→Device, Block #) to support reading the snapshot.

If the B bit is clear (step 15), then the snapshotter will copy-on-write the B block (step 17) before it is written by the move operation (step 19) so that there is an entry in the table for the B block (step 21) and the B bit is set in the bitmap (step 23).

If the B bit is set in the bitmap, there may or may not be an entry in the table for the B block. If B is free space at the time of the snapshot then there is no entry in the table. If the A bit is set (step 27), then the move operation writes B (step 29) and the snapshotter is done (step 25). There is no point in doing anything if changes to A can be ignored.

At this point we have reduced this problem to the case where the bit for block B is set and the bit for block A is clear. Now we let the move happen (step 29) and then change the bits to the A bit being set (step 31) and the B bit being clear (step 33). We add two entries to the translation table. (A→SameDevice, B) (step 35) and (B->>>>A) (step 37) where the ->>>>symbol is used to denote that B originally comes from A. The second type of entry provides for fast lookup and, in an embodiment of the invention, it may be used within the same table data structure as the first type of entry with no extra overhead. Those of skill in the art will recognize that the two kinds of table entry may equivalently be kept in two tables, and that reverse lookup may equivalently be performed in a translation table using only the first type of table entry.

FIG. 2 continues the illustration of FIG. 1 where, originally, the bit for block B was set and the bit for block A was clear, presenting the steps taken by the snapshotter with respect to a subsequent write of block A in FIG. 2A and a subsequent write of block B in FIG. 2B. In FIG. 2A, following the completion of the steps illustrated in FIG. 1 (step 41), henceforth A can be written freely (steps 43, 45), as its bit is set. In FIG. 2B, following the completion of the steps illustrated in FIG. 1 (step 51), a command to write to B in step 53 will result in a copy-on-write of B (step 55) followed by the write (step 57). The copy-on-write of B will then be added to the table in place of the previous entry (A→SameDevice, B), yielding (A→DiffAreaVolume, DiffAreaVolumeOffset) (step 59), the deletion of the (B->>>>A) entry (step 61), and the setting of the B bit (step 63). DiffAreaVolume and DiffAreaVolumeOffset represent the differential storage space volume device and block number, respectively, to which block B is copied.

FIG. 3 continues the illustration of FIG. 1 where, originally, the bit for block B was set and the bit for block A was clear, the steps associated with the move from A to B have occurred (through step 37 of FIG. 1), and a subsequent write of B has not yet occurred (step 69). In step 71, a move of block B to block C is initiated. The rules presented in FIG. 1 then apply, with block B now the old location (corresponding to block A in FIG. 1) and block C the new location (corresponding to block B in FIG. 1). The B bit is clear (from step 33 in FIG. 1). If the C bit is clear (step 73), then the snapshotter will copy-on-write the C block (step 75) before it is written by the move operation (step 77) so that there is an entry in the table for the C block (step 79) and the C bit is set in the bitmap (step 81).

If, prior to the move, the C bit is set, we let the move happen (step 85) and then change the bits to the B bit being set (step 87) and the C bit being clear (step 89). However, in preparing to insert (B→SameDevice, C) to the translation table, we find the (B->>>>A) table entry in place. At this point, the snapshotter effects a composition, yielding the entries (A→SameDevice, C) (step 91) and (C->>>>A) (step 93), which would replace (A→B) and (B->>>>A) (steps 95, 97).

Figure 4:
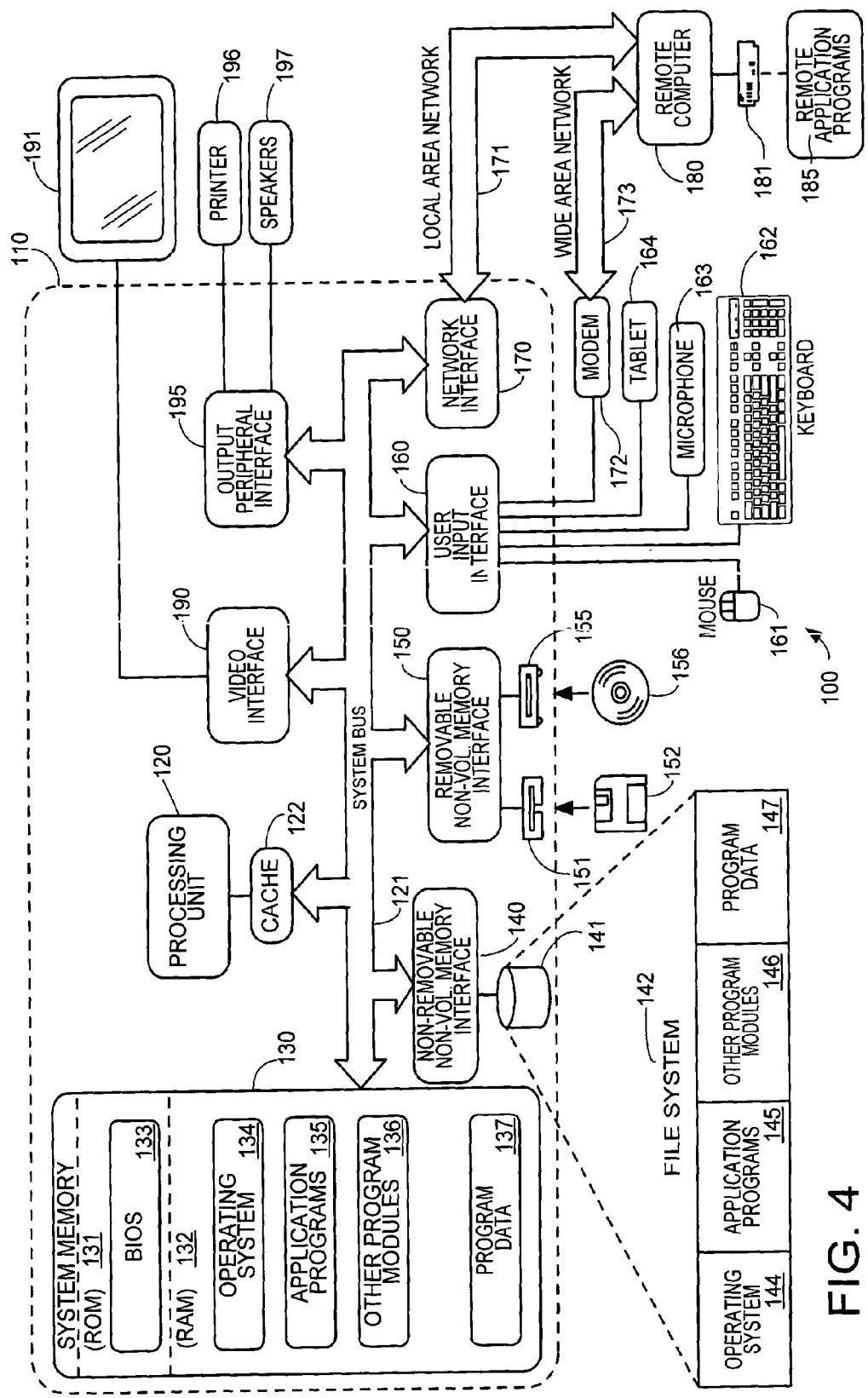
FIG. 4 illustrates one possible computer in the context of which an embodiment of the present invention may be practiced.

FIGS. 4-14 illustrate aspects of embodiments of the invention in further detail. FIG. 4 illustrates one exemplary computing environment 100 within which the present invention may be performed. The environment 100 includes a general-purpose stored-program computer machine 110, which may be connected to one or more other computer-based resources, such as a remote computer 180 connected to the computer device 110 by a local area network 171 or wide area network 173. The computer machine 110 includes at least one central processing unit 120 connected by a system bus 121 to a primary memory 130. One or more levels of a cache 122, connected to or situated within the processing unit 120, act as a buffer for the primary memory 130. Programs, comprising sets of instructions for the machine 110, are stored in the memory 130, from which they can be retrieved and executed by the processing unit 120. In the course of executing program instructions, the processing unit 120 retrieves data 137 stored in the memory 130 when necessary. Among the programs and program modules stored in the memory 130 are those that comprise an operating system 134.

The exemplary computer machine 110 further includes various input/output devices and media for writing to and reading from the memory 130, including secondary storage devices such as a non-removable magnetic hard disk 141, a removable magnetic disk 152, and a removable optical disk 156. Such computer-readable media provide nonvolatile storage of computer-executable instructions and data; the hard disk 141 is also commonly used along with the primary memory 130 in providing virtual memory. It will be appreciated by those skilled in the art that other types of computer-readable media that can provide volatile and nonvolatile storage of data accessible by a computer may also be used in the exemplary computer environment 100. The computer 110 has a file system 142 associated with the operating system 134. The file system 142 serves as an interface that maps a set of logically-organized named files to data physically stored on secondary media, such as data stored in clusters or sectors on the hard disk 141.

Figure 5:
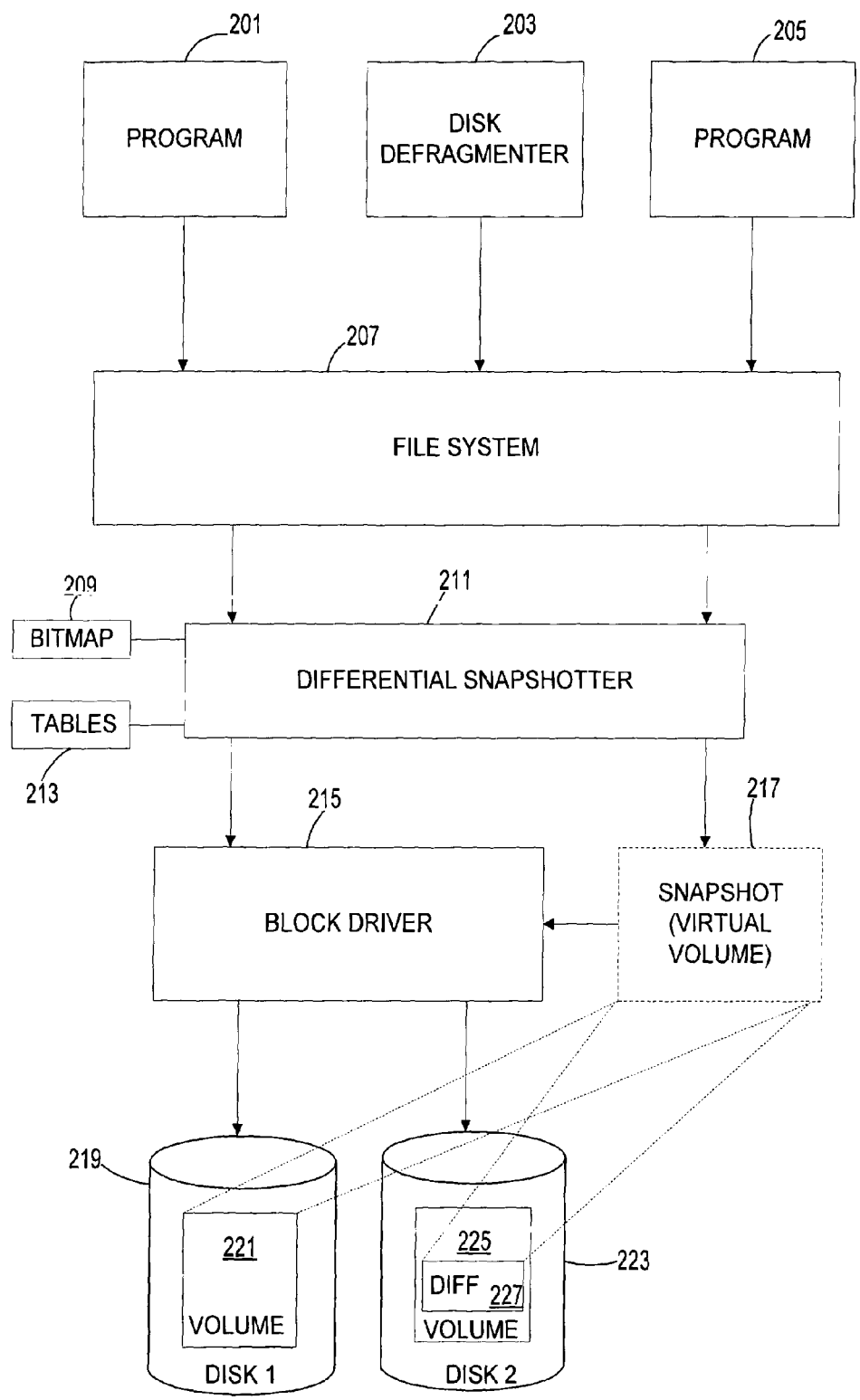
FIG. 5 illustrates an exemplary multi-level secondary storage system associated with a computer, such as the computer of FIG. 4, in the context of which an embodiment of the present invention may be practiced.

The diagram of FIG. 5 illustrates an exemplary multi-level secondary storage system associated with a computer such as the computer depicted in FIG. 4, in the context of which an embodiment of the invention may be practiced. A differential snapshotter 211 may be regarded as a driver that mediates between the file system 207 and a block driver 215. The block driver 215 provides sector-level access to data contained in volumes 221, 225 corresponding to hard disks 219, 223. The snapshotter 211 accesses data at the sector level through the block driver 215. Executing programs 201, 205, such as a disk defragmentation utility 203, access stored data at a higher, logical level through the file system interface 207.

The differential snapshotter 211 is directed to take a snapshot 217 of an original disk volume 221 at a specified point in time. The snapshot is a virtual volume 217 containing the versions of files in the volume 221 as they existed at the time of the snapshot. Initially, no copying of data in the original volume 221 is done by the differential snapshotter 211. After the time of the snapshot, the snapshotter 211 monitors and intercepts efforts by the file system 207 to access data blocks in the original volume 221 on behalf of executing programs 201, 203, 205. If the file system 207 attempts to write new data to a block, the snapshotter 211 first consults a bitmap 209 to determine whether it must preserve the data in that block with a copy-on-write operation before the write attempt can proceed. If a copy-on-write is necessary, the snapshotter 211 writes the copy to a special differential storage area 227, possibly stored in another volume 225 on another disk 223, recording information identifying the copied block and the location in which it was copied in one or more table data structures 213.

In embodiments of the invention, the file system 207 has the capacity to pass a BLOCK_COPY command to lower-level drivers, enabling lower-level drivers to take advantage of hardware acceleration for data block copies. In particular, the file system can pass the BLOCK_COPY command down to the snapshot driver 211 to request a logically insignificant relocation of a block from one block location to another in the volume 221. Having received the BLOCK_COPY request, which signifies that the requested data movement is not logically significant, the snapshotter 211 may be able to avoid performing a copy-on-write by using the bitmap 209 and tables 213 in a manner described in further detail below.

The snapshotter 211 also enables the file system 207 to read snapshot versions of files. To the file system 207 the snapshot virtual volume 217 appears to be another block device, which the file system 207 can mount. If a requested file that was in the original volume at the time of the snapshot has been logically changed or nonlogically moved since the time of the snapshot, the snapshotter 211, consulting its tables 213, will redirect the read request to the appropriate location in the differential storage space 227 or in the original volume 221 where that snapshot version is stored.

As mentioned above, a bitmap 209 is used by the snapshotter 211 to determine whether a particular block location must be protected by a copy-on-write operation. In the bitmap 209, a particular bit represents a particular block in the volume 221. When the snapshot is captured, a subset of the blocks in the volume 221 will be logically occupied, in the sense that they are at that moment being used to implement existing files. Another subset of blocks will constitute logically free space. In the initial configuration of the bitmap 209, all occupied-space blocks will have their corresponding bits set to "protect," and all free-space blocks will have their bits set to "ignore," because there is no reason to perform a copy-on-write for a block that was logically insignificant at the time of the snapshot. In the embodiment illustrated in the examples of FIGS. 1-3 above and in the examples discussed below, the "ignore" value is 1 and the "protect" value is 0. It should be noted that once a copy-on-write is performed for a particular block, it is no longer necessary for the snapshotter 211 to protect that block.

Figure 6A:
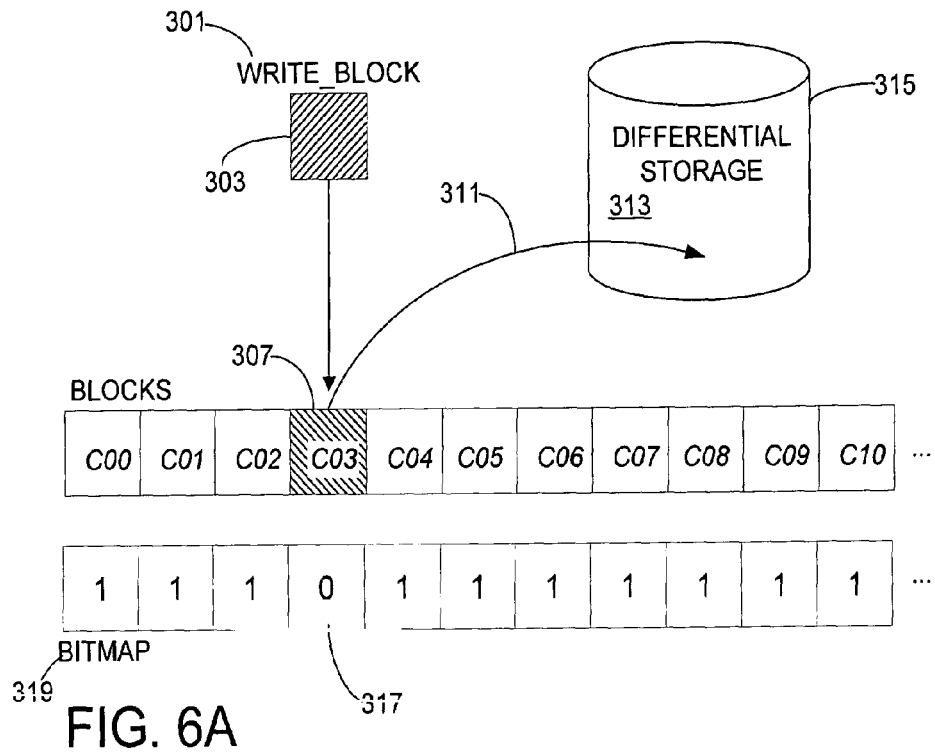
FIG. 6 is a diagram presenting a detailed example of the handling of a logically significant block write in an embodiment of the invention, with FIG. 6A providing the view before the write and FIG. 6B providing the view after the write.
Figure 6B:
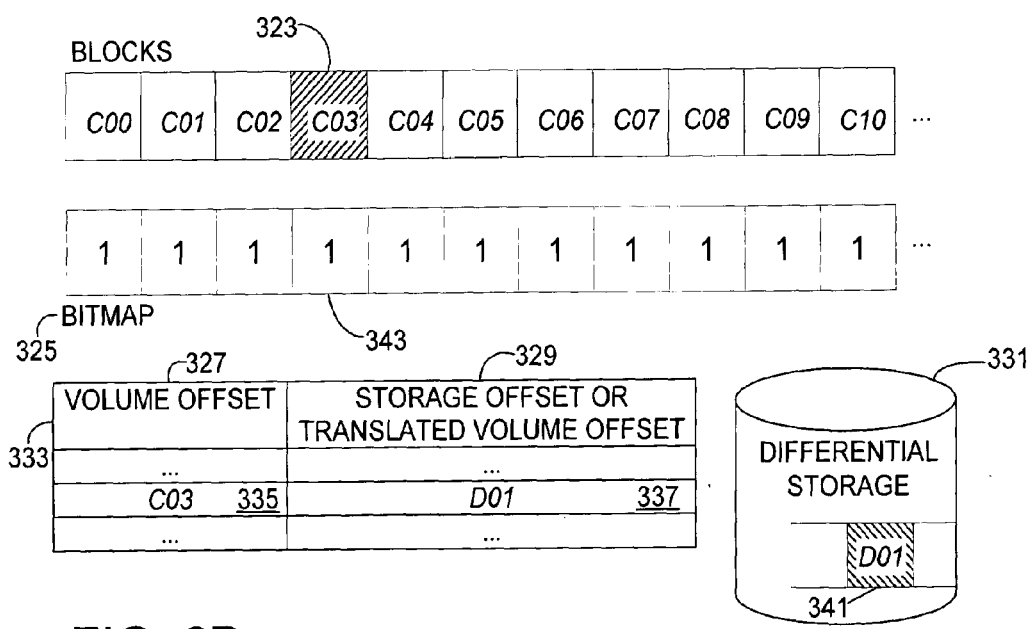

Referring now to FIG. 6, the depicted example illustrates how the snapshotter handles the straightforward case of a logically significant request to write a block location. In FIG. 6A, the snapshotter has intercepted a WRITE_BLOCK call 301 from the file system, which seeks to write data 303 at the block location here designated C03 307. The bit 317 in the bitmap 319 corresponding to this block is 0, so the block 307 must be protected with a copy-on-write operation 311 copying its data to differential storage space 313 located on a volume 315. FIG. 6B presents the view after the copy-on-write has taken place and after the write of block C03 323 has been permitted to go forward. The bit 343 corresponding to this block 323 is set to 1, since no further protection of the snapshot version of this block will be needed. The copy-on-write has been made at location D01 341 in the differential storage space 331. A table data structure 333, mapping blocks 327 to the location 329 at which the snapshot versions of those blocks are stored, records the fact that block C03 335 has been copied to differential location D01 337.

Figure 7A:
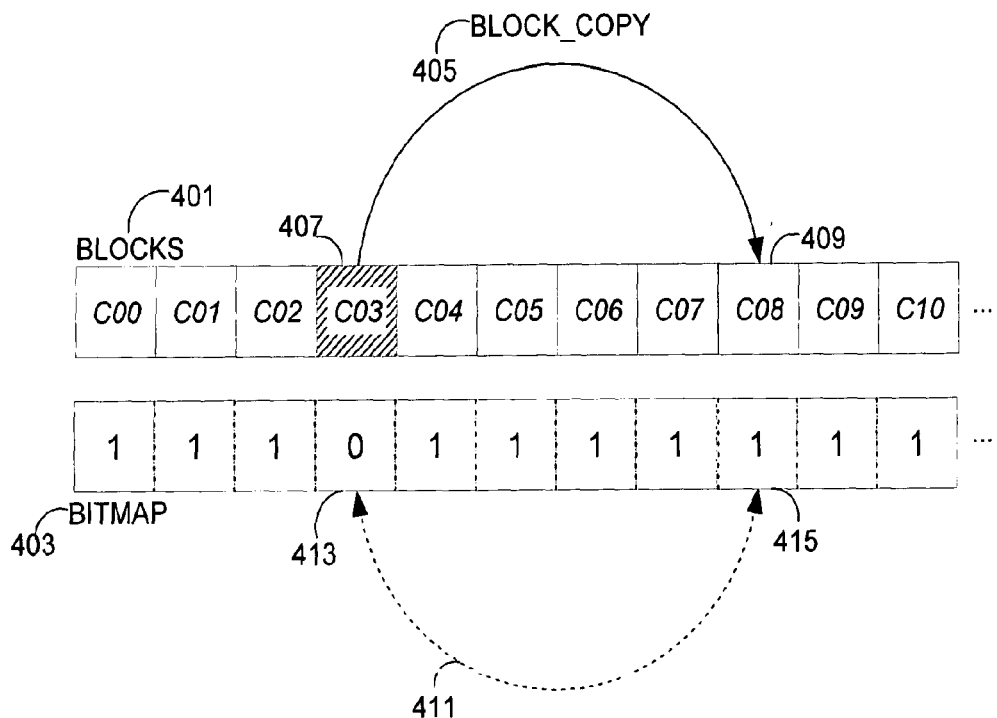
FIG. 7 is a diagram presenting a detailed example of the handling of a simple logically insignificant block move in an embodiment of the invention, with FIG. 7A providing the view before the block move and FIG. 7B providing the view after the move.

Referring now to FIG. 7, the depicted example shows the simplest case involving a logically insignificant block move, such as that which might be requested by the file system during the execution of a disk defragmentation operation following the time of the snapshot. The example illustrates how a copy-on-write operation is avoided in such a situation without any loss of information regarding the contents and location of the snapshot version of the protected block. FIG. 7A represents the situation after the request is intercepted but before it is permitted to proceed. The snapshotter is made aware of the nonlogical nature of the requested operation by the file system's use of a BLOCK_COPY call 405, in accordance with the invention, instead of READ_BLOCK and WRITE_BLOCK calls. Here the request involves the relocation of the data in block C03 407 to block C08 409 in the same volume 401. In the bitmap 403, the bit 413 corresponding to block C03 407 is 0, so some effort must be made to preserve the data in this block 407 as the snapshot version of block C03 407. The bit 415 corresponding to the destination block 409 is set to 1, as might be expected if the requested move is a defragmentation operation selecting a current free-space location in the volume 401 as the new location for the block data being moved. If the bitmap bits 413, 415 corresponding to blocks C03 407 and C08 409 in FIG. 4A had been other than 0 and 1, respectively, the snapshotter would have handled the BLOCK_COPY request 405 differently. This will be explained below in the discussion of the flow diagram of FIG. 13.

Figure 7B:
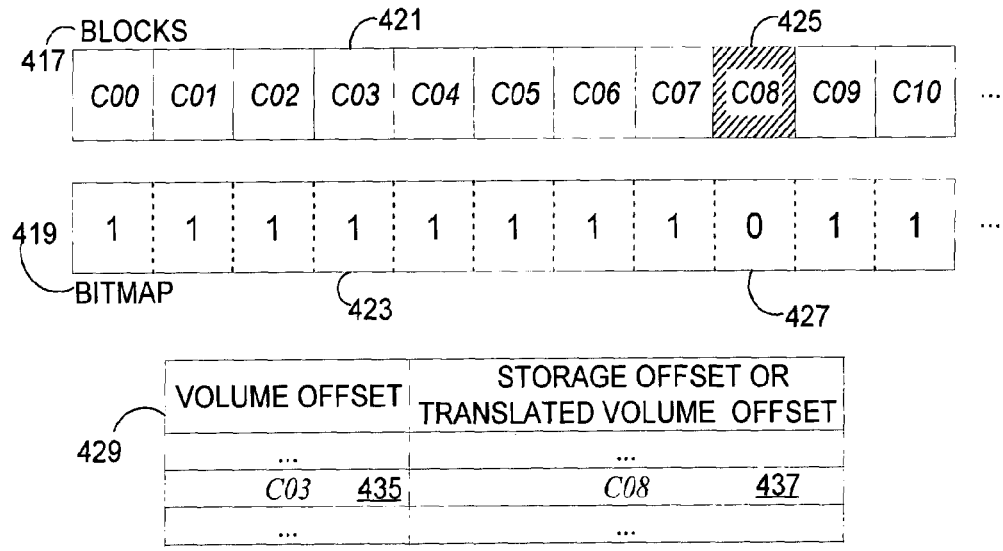

As a consequence of the requested block move, a logically occupied block, which is one of the blocks that must be protected by the snapshotter, becomes free space, and a free-space block becomes occupied space. This change can be reflected in the bitmap simply by exchanging the bit values 411 in the two bits 413, 415 corresponding to the two blocks 407, 409 involved in the move. FIG. 7B depicts the situation after the block move has taken place. Block C08 425 now holds the data that was previously held in block C03 421, and the corresponding bits 423, 427 in the bitmap 419 have been switched. The relocation of the snapshot version of block C03 435 to block C08 437 is recorded in the table 429. The mapping here is a translation to another offset in the volume 417. If the snapshotter receives a request to read the snapshot version of block C03, it will look up C03 435 in the table 429 and find that the snapshot copy is currently located at C08 437. The read request will be directed to block C08 425.

Figure 8A:
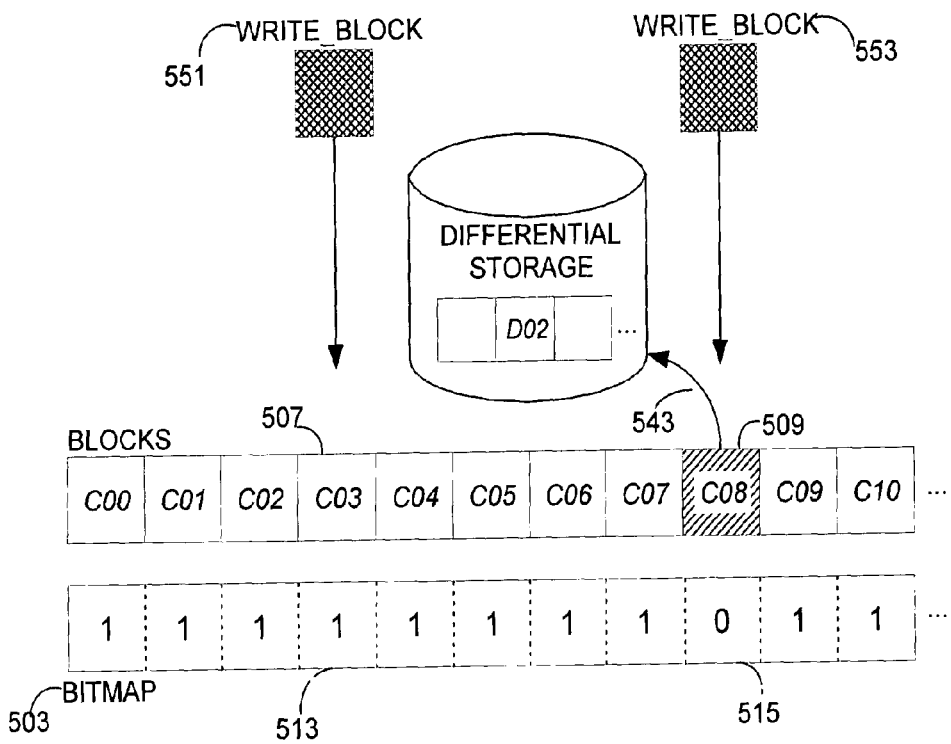
FIG. 8 is a diagram continuing the detailed example of FIG. 7, presenting the handling of two logically significant block write requests in an embodiment of the invention, including a write at a block location from which a data block was nonlogically moved, and a write at the block location to which that block was moved, with FIG. 8A providing the view before the writes and FIG. 8B providing the view after the writes.
Figure 8B:
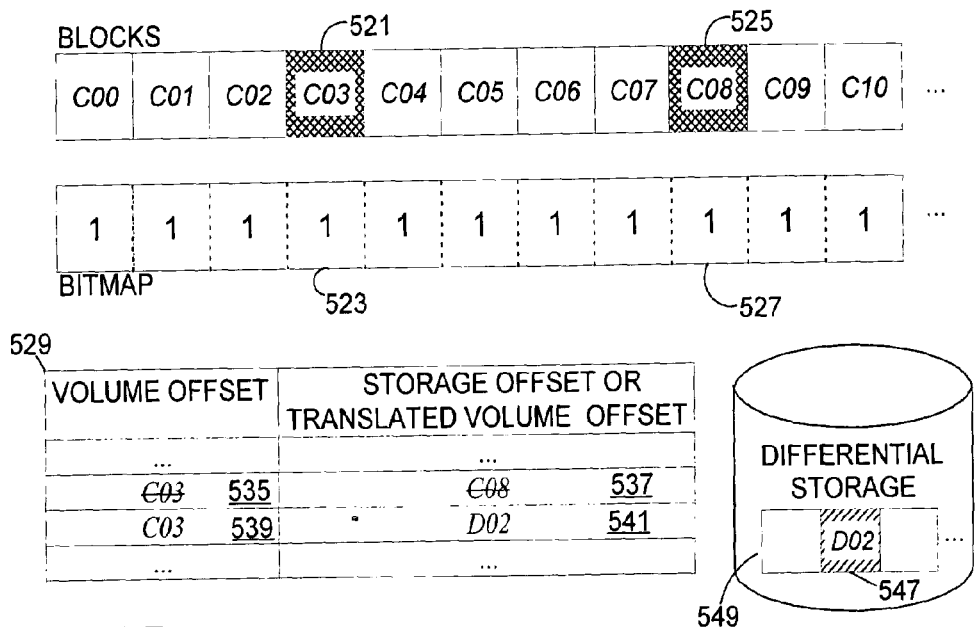

Referring now to FIG. 8, the depicted example proceeds from the state of FIG. 7B. In FIG. 8A, two logically significant WRITE_BLOCK requests 551, 553 are received for the respective block locations C03 507 and C08 509, the same locations that were involved in the preceding logically insignificant move. The request 551 to write block C03 507 will be allowed by the snapshotter without further action, since its corresponding bit 513 in the bitmap 503 is set to 1, indicating that it can be written freely. The bit 515 corresponding to block C08 509, however, is 0, so it must be protected with a copy-on-write before it can be written. FIG. 5B illustrates the situation following the writes. Blocks C03 521 and C08 525 now hold the new data. The bitmap bit 523 corresponding to block C03 521 remains 1, of course. The bit 527 corresponding to block C08 525 is set to 1 following the copy-on-write 543 depicted in FIG. 8A. The copy-on-write 543 copied the old value of C08 509, which is the snapshot version of current block C03 521, in location D02 547 in the differential storage space 549. In the storage/translation table 529, the mapping 537 for block C03 535 is updated accordingly, recording D02 541 as the current location of the snapshot block C03 539.

Although the diagrams of FIGS. 6-10 show a single mapping table for illustrative simplicity, an additional reverse mapping table may be used. This reverse mapping table may be stored as part of the same data structure as the direct-mapping translation table, as in the flow diagrams of FIGS. 1-3, or, in the alternative, it may be maintained as a separate data structure. A reverse mapping table entry provides, for fast lookup, the mapping from a first block in the original volume to a second block in the same volume, the second block signifying the location whose snapshot version the first block is holding. In the example of FIG. 8, the snapshotter looks up C08 in the reverse mapping table, finding C08 mapped to C03, the block location of C08's data at the time of the snapshot.

While the case of FIGS. 7 and 8 is one in which there was ultimately no net benefit in the original avoidance of a copy-on-write, in general it is impossible to predict whether there will be a logically significant write to a block that has previously been the subject of a logically insignificant move. In the case of a block move pursuant to a defragmentation operation, it is particularly likely that the benefit of avoiding the copy-on-write will be preserved, since the defragmentation of an entire volume of blocks will involve many moves, only a small number of which can be expected to be the subject of subsequent logical writes.

Figure 9A:
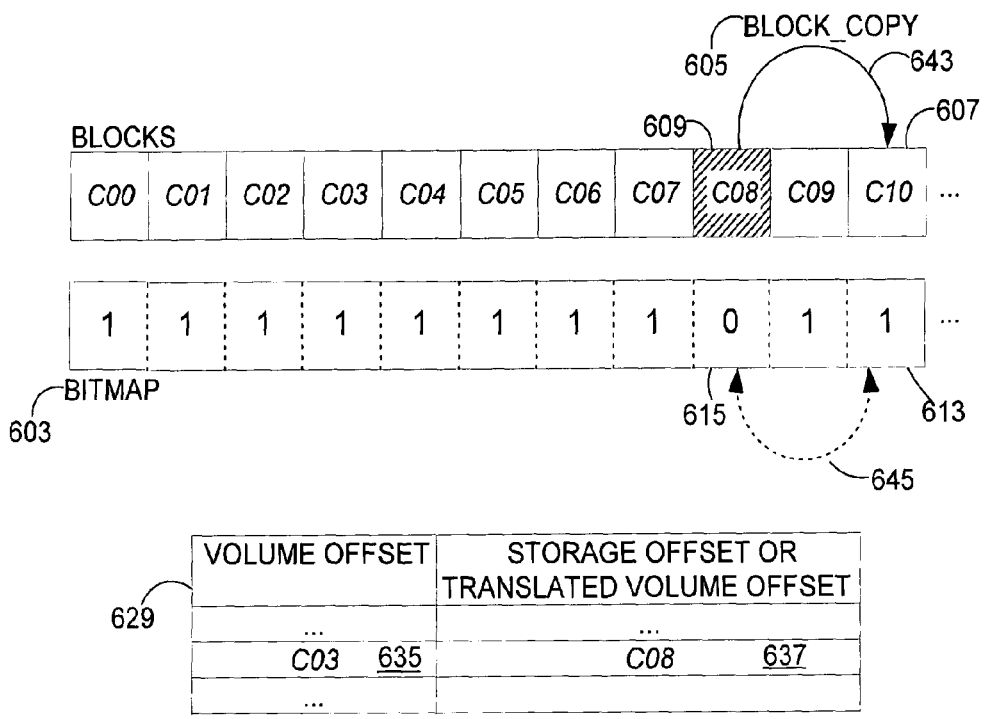
FIG. 9 is a diagram continuing the detailed example of FIG. 7, presenting the handling of a second logically insignificant block move following the first move depicted in FIG. 7, with FIG. 9A providing the view before the block move and FIG. 9B providing the view after the move.
Figure 9B:
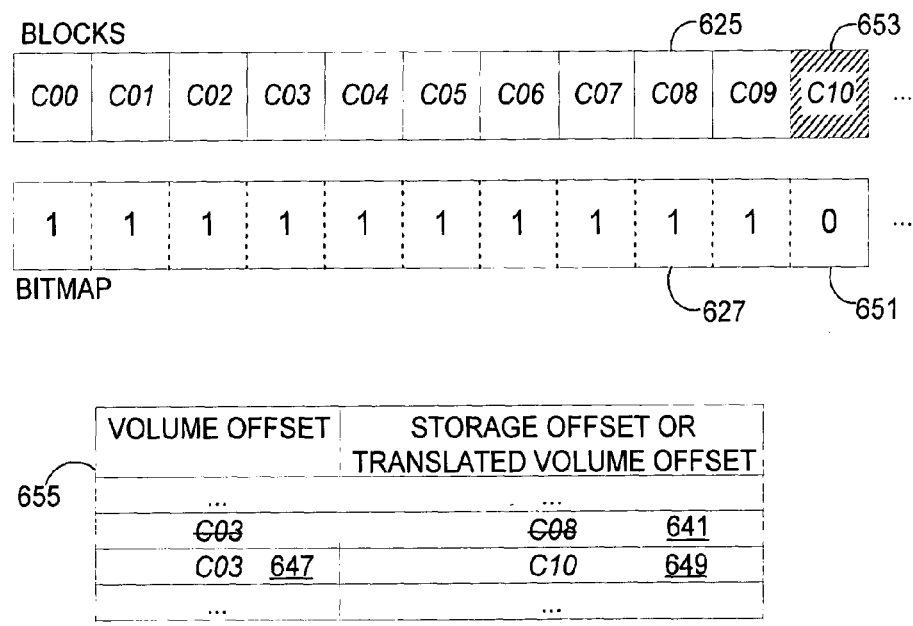

Referring now to FIG. 9, the example depicted therein proceeds from the state of FIG. 7B and illustrates how the snapshotter handles the move of a previously-moved block. In FIG. 9A, the snapshotter intercepts a file system BLOCK_COPY command 605 for a logically insignificant move 643 from block C08 609 to block C10 607, in accordance with the invention. The bitmap bits 615, 613 for these blocks are 0 and 1 respectively, as in the example of FIG. 7, and again the bits 615, 613 will be exchanged 645 in order to update the bitmap 603 to reflect the changed block configuration. The snapshotter looks up C08 637 in the reverse mapping table corresponding to the depicted table 629, finding the reverse mapping to C03 635, signifying that block C08 609 is the current location of the snapshot version of block C03 635. As shown in FIG. 9B, representing the state after the data previously stored in block C08 625 has been moved to C10 653, the table 655 is updated so that C03 647 is mapped compositionally to C10 649 rather than to C08 641. The bits 627, 651 corresponding to blocks C08 625 and C10 653 respectively have been exchanged, with C01's bit 651 now having the protect value 0.

Figure 10A:
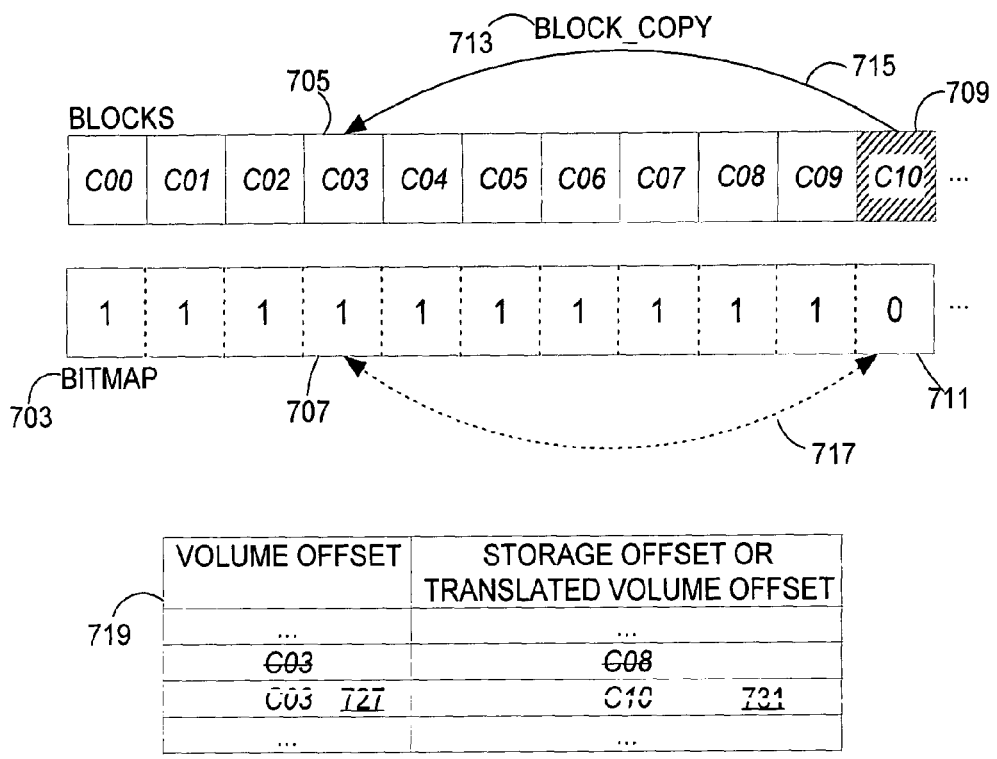
FIG. 10 is a diagram continuing the detailed example of FIG. 9, presenting the handling of a third logically insignificant block move following the second move depicted in FIG. 9, where the move is to the original block location as presented in FIG. 7, with FIG. 10A providing the view before the block move and FIG. 10B providing the view after the move.
Figure 10B:
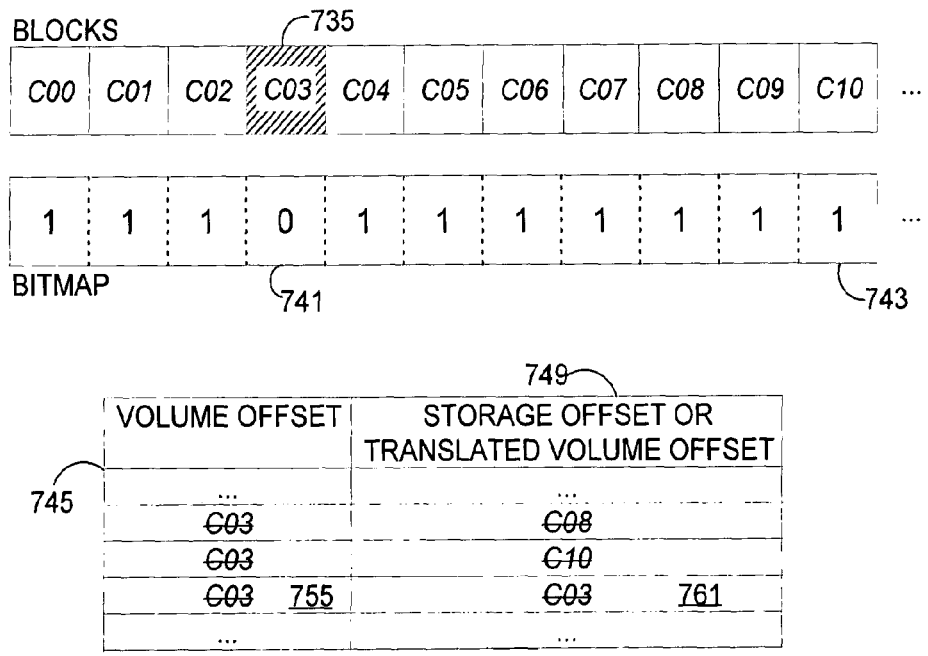

Referring now to FIG. 10, the example of FIG. 9 is continued in FIG. 10A, with a file system attempt 715 to nonlogically move the data in block C10 709 to block C03 705, using the BLOCK_COPY command 713 in accordance with the invention. The move destination 705 is also the snapshot-time location of data currently stored in C10 709. The bitmap bits 711, 707 corresponding to blocks C10 709 and C03 705 are 0 and 1 respectively, and the bits are exchanged 717, as seen in FIG. 10B following the move, where C10's bit 743 is now 1 and C03's bit 741 is 0, as in the original bitmap 703. A lookup of C10 731 in the reverse mapping table corresponding to the depicted table 719 reveals C10 731 to be the current location of the snapshot version of block C03 727. The appropriate update to the table 745 is the entry 761, 755 mapping C03 to C03, but this is a cycle that may simply be removed from the table. Thus, with respect to block C03 735, the snapshot-time status quo has been restored.

The algorithms applied in the previous examples are presented in further detail in the flow diagrams of FIGS. 11-14.

Figure 11:
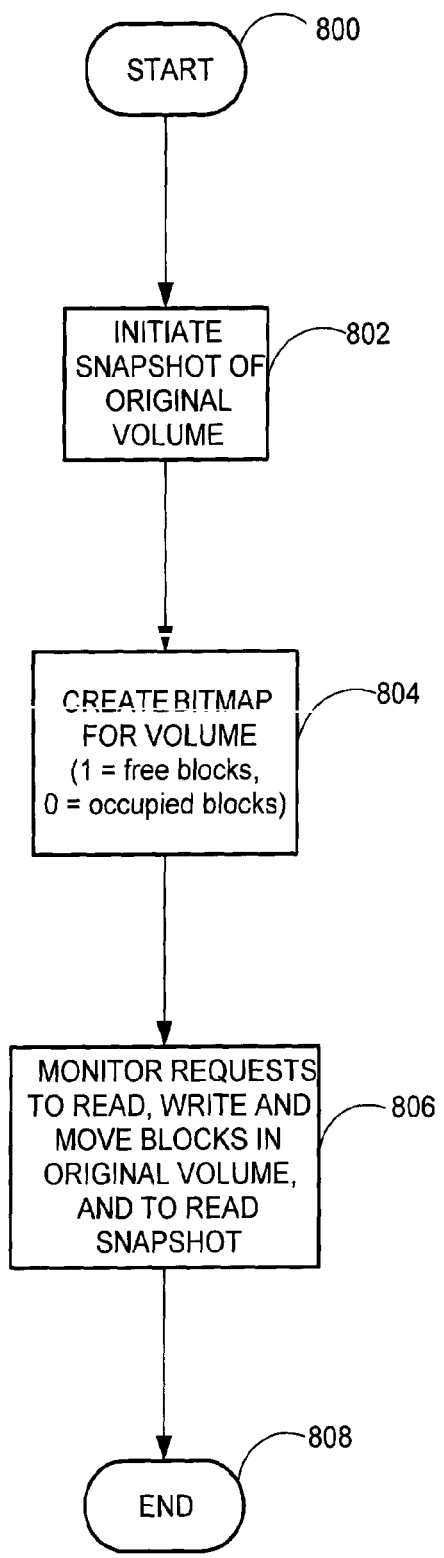
FIG. 11 is a flow diagram presenting a high-level view of the steps taken in an embodiment of the invention with respect to capturing and maintaining the snapshot.

FIG. 11 represents a procedural overview of an embodiment of the invention. At step 800 the procedure is begun. In step 802 the snapshotter captures a snapshot of an original disk volume at a point in time, following which, in step 804, it creates the associated bitmap, initially assigning 1 (the "ignore" value) to logically free blocks and 0 (the "protect" value) to logically occupied blocks. In step 806 the snapshotter assumes the role of monitoring file system requests to access blocks in the original volume, as well as the role of enabling the file system to read the snapshot virtual volume. The method relating to the snapshot of step 802 terminates in step 808.

Figure 12:
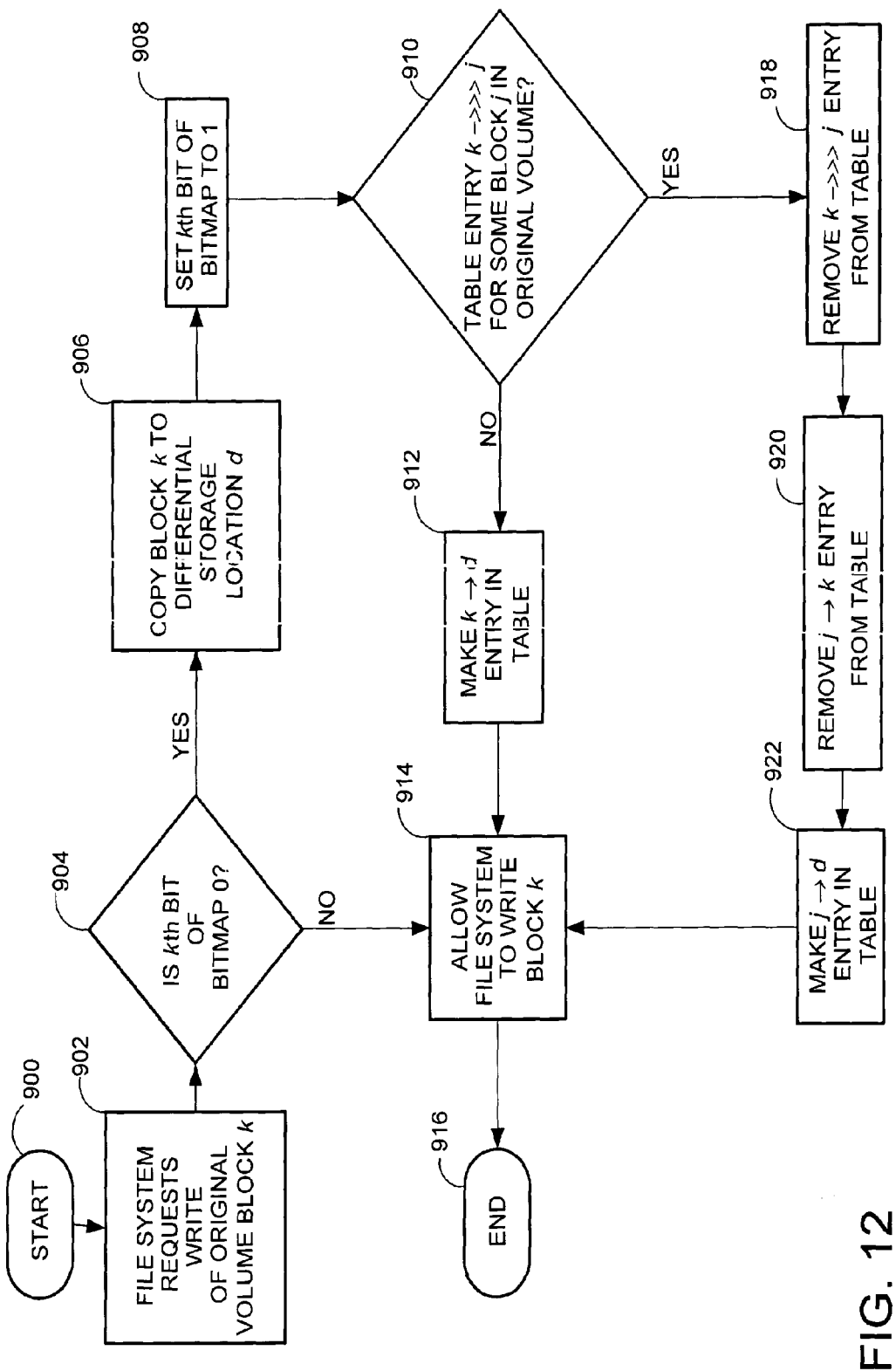
FIG. 12 is a flow diagram presenting the steps taken in an embodiment of the invention with respect to the handling of a logically significant write request.
Figure 13:
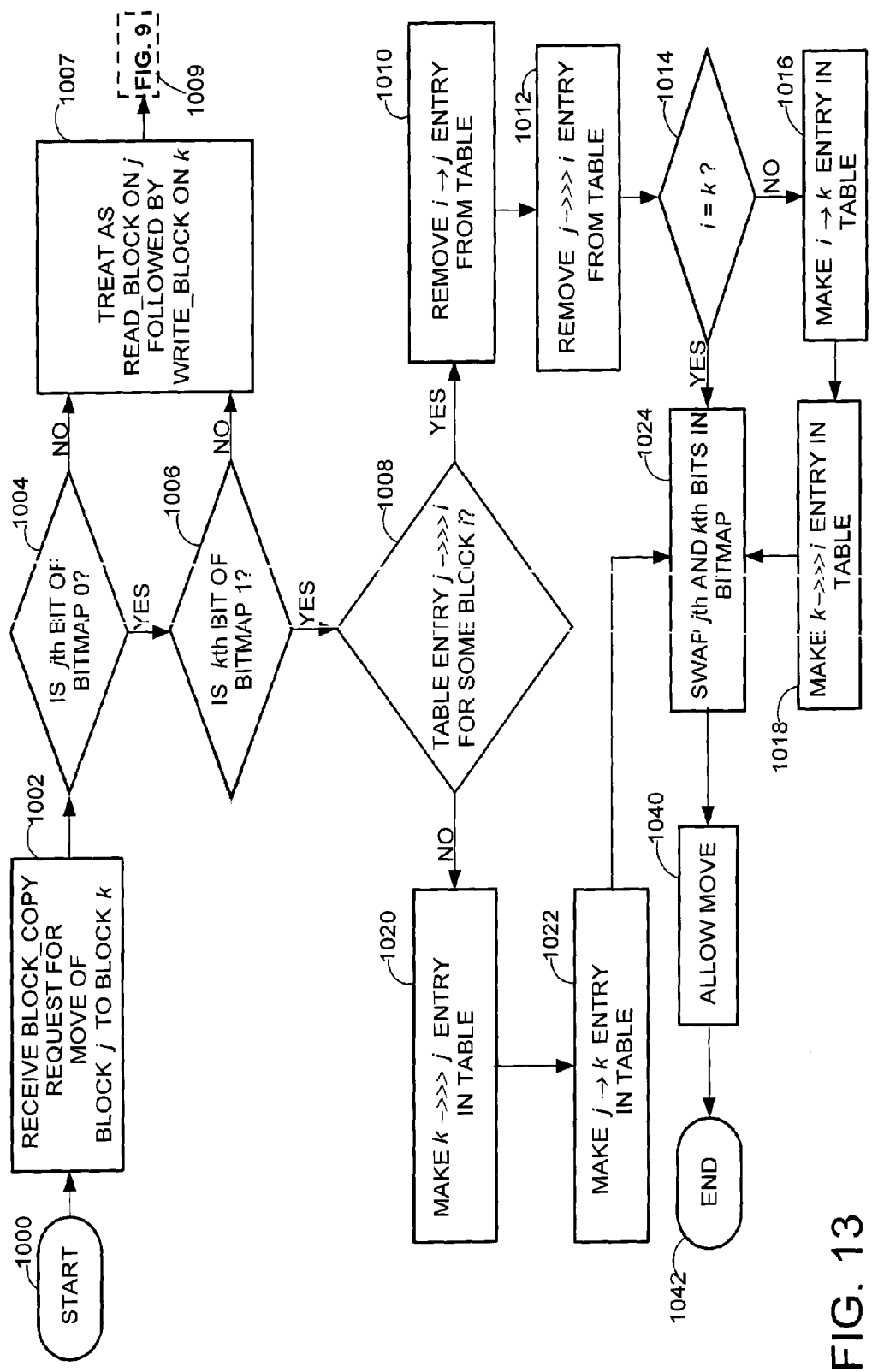
FIG. 13 is a flow diagram presenting the steps taken in an embodiment of the invention with respect to the handling of a logically insignificant request to move a block.
Figure 14:
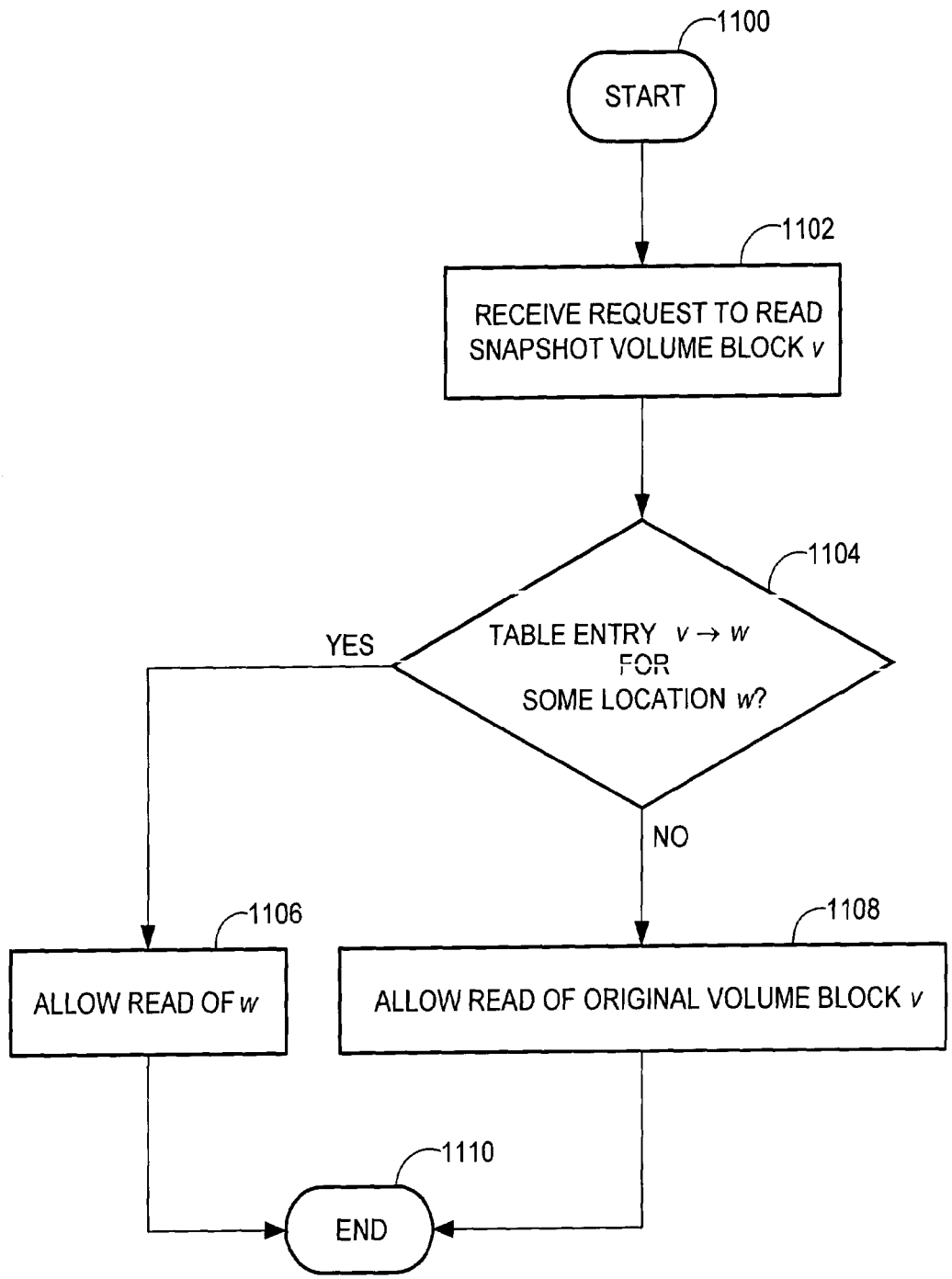
FIG. 14 is a flow diagram presenting the steps taken in an embodiment of the invention with respect to the handling of a request to read a block in the virtual volume corresponding to the snapshot of the original volume.

FIGS. 12-14 expand upon the post-snapshot step 806 of FIG. 11. These diagrams, like the flow diagrams of FIGS. 1-3, assume that the snapshotter maintains one translation table holding up to two mappings for each original volume block entry a. One mapping, denoted a→b, signifies that block b currently stores the snapshot copy of a. A second mapping, denoted a->>>c, the reverse mapping referred to above, signifies that block a currently stores the snapshot copy of c.

The flow diagram of FIG. 12 presents the steps associated with the interception of a logically significant WRITE_BLOCK from the file system. Following the entry into the procedure (step 900), in step 902 the snapshotter detects an effort by the file system to logically write block k in the original volume. In step 904, the snapshotter checks the value of the corresponding bit in the bitmap. If this bit is 1, the file system write can proceed (step 914) and the snapshotter exits the procedure (step 916). If the bit is 0, the block data must be protected. A copy-on-write operation copies the block to a differential storage location d (step 906), and the bit corresponding to the copied block is set to 1 (step 908), permitting subsequent accesses of the block to be ignored.

In step 910 the snapshotter determines whether there is an entry k->>>j in the table, reverse-mapping k to some block j in the original volume. If so, block k is the current location of the snapshot version of block j. The snapshotter removes this reverse mapping (step 918) and the corresponding direct mapping j→k from the table (step 920). It makes a new table entry j→d, recording differential storage location d as the current location of the snapshot version of j (step 922). At step 914 the file system is permitted to write block k, and the snapshotter then exits (step 916). If, however, there was no reverse-mapping entry for k in the table, the snapshotter makes an entry k→d in the table (step 912). Block k can then be written by the file system (step 914), and the algorithm terminates (step 916).

The flow diagram of FIG. 13 presents the steps associated with the interception of a file system attempt to nonlogically move a block of data from one block location j to another block location k in the volume. The snapshotter enters the procedure (step 1000) and receives the move request (step 1002). The bitmap bits for the source and destination blocks are examined respectively in steps 1004 and 1006. If the bit corresponding to block j is 1, or if the bit corresponding to block k is 0, the snapshotter will treat the request as a READ_BLOCK on j to be followed by a WRITE_BLOCK on k using the data stored in j (step 1007). To handle the WRITE_BLOCK on k, the snapshotter follows the procedure outlined in FIG. 12 (step 1009).

If the bit corresponding to j is 0 and the bit corresponding to k is 1, the optimization associated with the invention can be realized. The snapshotter determines whether there is a reverse-mapping entry j->>>i in the table mapping j to some block i in the same volume (step 1008). If so, j is currently storing the snapshot version of block i. The direct-mapping table entry i→j is deleted (step 1010), and the corresponding reverse-mapping table entry j->>>i is deleted (step 1012). If i and k are not the same block location, determined at step 1014, a direct-mapping entry i→k is added to the table (step 1016), as is the corresponding reverse mapping k->>>i (step 1018). These two steps are skipped if i and k are the same. In either case, the bits corresponding to j and k are swapped (step 1024), the block move is allowed to proceed (step 1040), and the procedure terminates (step 1042), the block move having been achieved without a copy-on-write operation.

Finally, the flow diagram of FIG. 14 presents the steps taken by the snapshotter in enabling the file system to read the virtual snapshot volume. The procedure begins at step 1100, and at step 1102 a file system request to read a particular block v in the snapshot volume is received. The snapshotter determines whether there is an entry v→w in the table (step 1104). If such an entry exists, it signifies that the snapshot copy of block v is stored at another location w, either in the same volume or in the differential storage space. The snapshotter directs the file system read to w (step 1106), and the procedure terminates (step 1110). If there is no entry for v in the table, the snapshot copy of block v is the same as the current contents of block v in the original volume. The snapshotter therefore directs the read to the actual block v (step 1108), and the procedure terminates (step 1110).

The foregoing detailed description discloses a method for capturing and maintaining a differential snapshot in which logically significant writes of data blocks are distinguished from logically insignificant moves of block data. The ability of the snapshotter to make this distinction is accomplished by an innovation in the file system whereby a BLOCK_COPY command can be passed to drivers below the file system level, which also enables those drivers to take advantage of hardware acceleration of data block copies. With respect to the differential snapshotter, substantial economies of processing time and storage space are achieved. While, as those skilled in the art will readily recognize, the invention is susceptible to various modifications and alternative constructions, certain illustrative embodiments have been shown in the accompanying drawings and have been described above in detail. It should be understood, however, that there is no intention to limit the invention to the specific forms disclosed. On the contrary, the intention is to cover all modifications, alternative constructions, and equivalents falling within the spirit and scope of the invention.

What is claimed is:

1. A method comprising:
  receiving a block copy command that is associated with a file system;
  a differential snapshotter intercepting the block copy command by the file system that involves writing data to a block in a volume of a disk and performing actions, comprising:
  preventing the command to occur until a determination is made as to the data in the block to be written to is to be protected using a copy-on-command and when the block is to be written without using the copy-on-command;
  wherein the differential snapshotter takes a snapshot of the volume of the disk and that keeps a translation table and wherein the snapshotter keeps a bitmap of blocks in the volume, wherein, for a bit in the bitmap corresponding to a block in the volume, a first bit value indicates that the snapshotter does not need to protect the block by performing a copy-on-write before the block is written in response to performing the block copy command, and a second bit value indicates that the snapshotter protects the block with a copy-on-write before the block is written; and wherein performing the block copy command results in the block move from the location A on the volume to the location B on the volume.

2. The method of claim 1, further comprising, when a bit in the bitmap corresponding to the location B has the second bit value:
  performing a copy-on-write of the location B to a differential area location before the location B is written by the block move;
  adding a table entry registering the copy-on-write of the location B to the differential area location; and
  changing the bit corresponding to the location B to the first bit value.

3. The method of claim 1, further comprising, when a bit in the bitmap corresponding to the location B has the first bit value, and when a bit in the bitmap corresponding to the location A has the second bit value:
  letting the block move happen;
  changing the bit corresponding to the location A to the first bit value;
  changing the bit corresponding to the location B to the second bit value; and
  adding a table entry mapping the location A to the location B.

4. The method of claim 3, further comprising adding a table entry mapping the location B back to the location A.

5. The method of claim 3, further comprising, when, at a later time, a write of the location B is to occur:
  performing a copy-on-write of the location B to a differential area location before the write occurs;
  replacing the table entry mapping the location A to the location B with a table entry mapping the location A to the differential area location; and
  changing the bit corresponding to the location B to the first bit value.

6. The method of claim 5, further comprising, when there is a table entry mapping the location B back to the location A, deleting the table entry.

7. The method of claim 3, further comprising, when a subsequent write of the location B has not yet occurred and a block move from the location B to a location C is initiated:
  when a bit in the bitmap corresponding to the location C has the second bit value, performing a copy-on-write of the location C to a differential area location before it is written by the block move;
  adding a table entry registering the copy-on-write of the location C to the differential area location; and
  changing the bit corresponding to the location C to the first bit value;
  otherwise, when the bit corresponding to the location C has the first bit value, letting the block move happen;
  changing the bit corresponding to the location B to the first bit value;
  changing the bit corresponding to the location C to the second bit value;
  replacing the table entry mapping the location A to the location B with a table entry mapping the location A to the location C; and
  when there is a table entry mapping the location B back to the location A, replacing the table entry with a table entry mapping the location C back to the location A.

8. A computer-readable storage medium having computer-executable instructions for performing actions, comprising:
  receiving a block copy command that is associated with a file system;
  a differential snapshotter intercepting the block copy command and determining when the block copy command uses a copy-on-write to write data to a block and when the block copy command does not use the copy-on-write to write data to the block, wherein the differential snapshotter keeps a translation table and wherein the snapshotter keeps a bitmap of blocks in the volume of a disk, wherein, for a bit in the bitmap corresponding to a block in the volume, a first bit value indicates that the snapshotter does not need to take any action to protect the block by performing a copy-on-write before when the block is written in response to performing the block copy command, and a second bit value indicates that the snapshotter protects the block with a copy-on-write before the block is written in response to performing the block copy command; and wherein the block copy command results in the block move from the location A on the volume to the location B on the volume.

9. The computer-readable storage medium of claim 8, further comprising, when a bit in the bitmap corresponding to the location B has the second bit value:
performing a copy-on-write of the location B to a differential area location before the location B is written by the block move;
adding a table entry registering the copy-on-write of the location B to the differential area location; and
changing the bit corresponding to the location B to the first bit value.

10. The computer-readable storage medium of claim 8, further comprising, when a bit in the bitmap corresponding to the location B has the first bit value, and when a bit in the bitmap corresponding to the location A has the second bit value:
letting the block move happen;
changing the bit corresponding to the location A to the first bit value;
changing the bit corresponding to the location B to the second bit value; and
adding a table entry mapping the location A to the location B.

11. The computer-readable storage medium of claim 10, further comprising adding a table entry mapping the location B back to the location A.

12. The computer-readable storage medium of claim 10, further comprising, when, at a later time, a write of the location B is to occur:
performing a copy-on-write of the location B to a differential area location before the write occurs;
replacing the table entry mapping the location A to the location B with a table entry mapping the location A to the differential area location; and
changing the bit corresponding to the location B to the first bit value.

13. The computer-readable storage medium of claim 12, further comprising, when there is a table entry mapping the location B back to the location A, deleting the table entry.

14. The computer-readable storage medium of claim 10, further comprising, when a subsequent write of the location B has not yet occurred and a block move from the location B to a location C is initiated:
when a bit in the bitmap corresponding to the location C has the second bit value, performing a copy-on-write of the location C to a differential area location before it is written by the block move;
adding a table entry registering the copy-on-write of the location C to the differential area location; and
changing the bit corresponding to the location C to the first bit value;
otherwise, when the bit corresponding to the location C has the first bit value, letting the block move happen;
changing the bit corresponding to the location B to the first bit value;
changing the bit corresponding to the location C to the second bit value;
replacing the table entry mapping the location A to the location B with a table entry mapping the location A to the location C; and
when there is a table entry mapping the location B back to the location A, replacing the table entry with a table entry mapping the location C back to the location A.

15. A system for performing actions, comprising:
a processor that is configured to perform operations;
a file system that receives a block copy command;
a snapshotter that is coupled to a file system and utilizes the processor to perform steps, comprising:
intercepting from the file system the block copy command and determining when the block copy command uses a copy-on-write to write data to a block and when the block copy command does not use the copy-on-write to write data to the block;
maintaining a translation table;
maintaining a bitmap of blocks in a volume of the disk, wherein, for a bit in the bitmap corresponding to a block in the volume, a first bit value indicates that the snapshotter does not need to protect the block by performing a copy-on-write before the block is written, and a second bit value indicates that the snapshotter protects the block with a copy-on-write before the block is written; and
wherein the block copy command results in the block move from the location A on the volume to the location B on the volume.

16. The system of claim 15, further comprising, when a bit in the bitmap corresponding to the location B has the second bit value:
performing a copy-on-write of the location B to a differential area location before the location B is written by the block move;
adding a table entry registering the copy-on-write of the location B to the differential area location; and
changing the bit corresponding to the location B to the first bit value.

17. The system of claim 15, further comprising, when a bit in the bitmap corresponding to the location B has the first bit value, and when a bit in the bitmap corresponding to the location A has the second bit value:
letting the block move happen;
changing the bit corresponding to the location A to the first bit value;
changing the bit corresponding to the location B to the second bit value; and
adding a table entry mapping the location A to the location B.

18. The system of claim 17, further comprising adding a table entry mapping the location B back to the location A.

19. The system of claim 17, further comprising, when, at a later time, a write of the location B is to occur:
performing a copy-on-write of the location B to a differential area location before the write occurs;
replacing the table entry mapping the location A to the location B with a table entry mapping the location A to the differential area location;
changing the bit corresponding to the location B to the first bit value; and when there is a table entry mapping the location B back to the location A, deleting the table entry.

20. The system of claim 17, further comprising, when a subsequent write of the location B has not yet occurred and a block move from the location B to a location C is initiated:
- when a bit in the bitmap corresponding to the location C has the second bit value, performing a copy-on-write of the location C to a differential area location before it is written by the block move;
- adding a table entry registering the copy-on-write of the location C to the differential area location; and
- changing the bit corresponding to the location C to the first bit value;
- otherwise, when the bit corresponding to the location C has the first bit value, letting the block move happen;
- changing the bit corresponding to the location B to the first bit value;
- changing the bit corresponding to the location C to the second bit value;
- replacing the table entry mapping the location A to the location B with a table entry mapping the location A to the location C; and
- when there is a table entry mapping the location B back to the location A, replacing the table entry with a table entry mapping the location C back to the location A.

* * * * *